Figure 1:
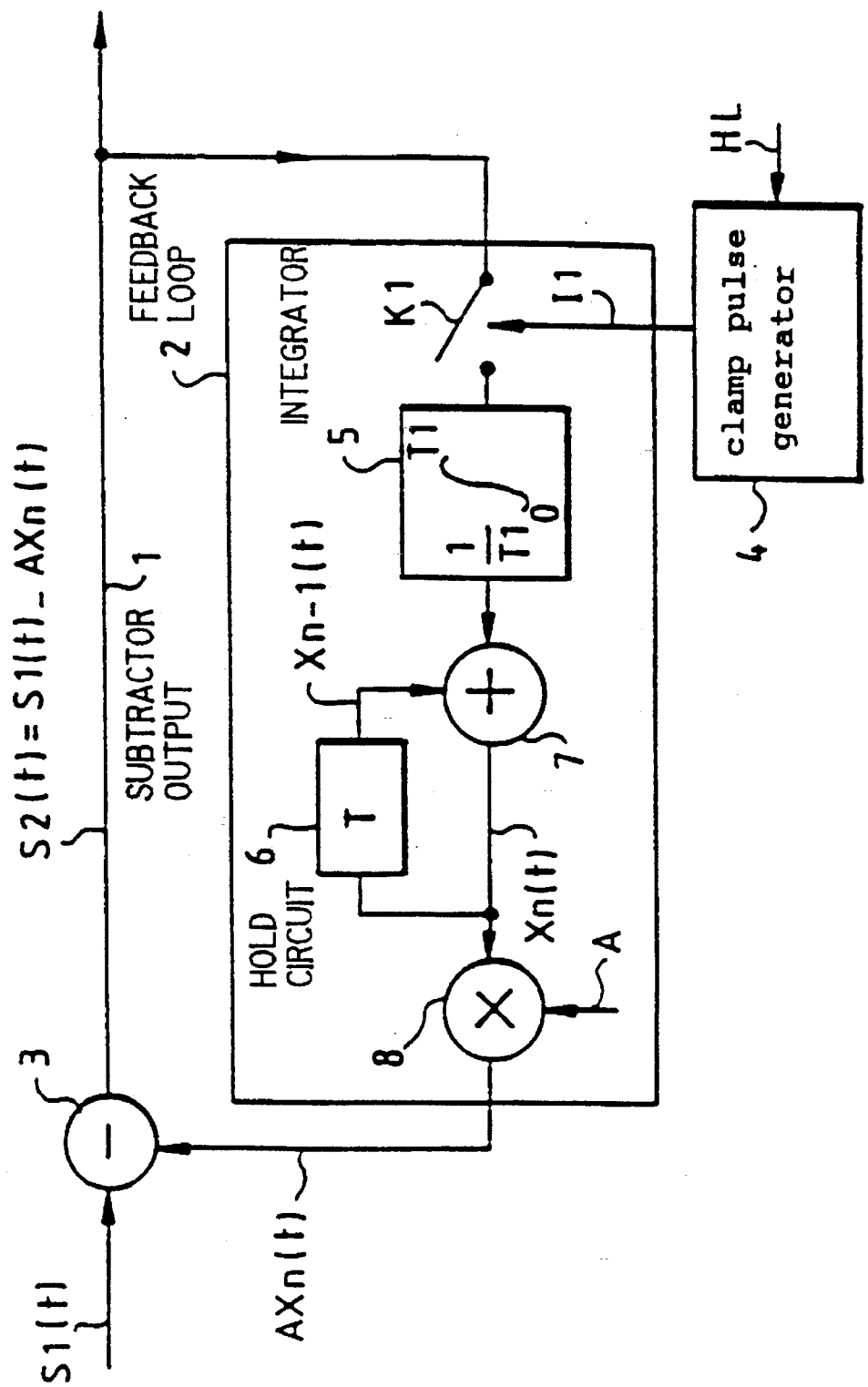

United States Patent [19]

Paquier et al.

[11] Patent Number: 5,548,343
[45] Date of Patent: Aug. 20, 1996

[54] METHOD OF SIGNAL ALIGNMENT IN TELEVISION AND DEVICE FOR IMPLEMENTING IT

[75] Inventors: Jean-Luc Paquier, Eragny; Dominique Guillevic, Montmorency, both of France

[73] Assignee: Thomcast, Conflans Ste Honorine, France

[21] Appl. No.: 318,632

[22] PCT Filed: Apr. 14, 1993

[86] PCT No.: PCT/FR93/00373

§ 371 Date: Dec. 5, 1994

§ 102(e) Date: Dec. 5, 1994

[87] PCT Pub. No.: WO93/21727

PCT Pub. Date: Oct. 28, 1993

[30] Foreign Application Priority Data

Apr. 14, 1992 [FR] France ................... 92 04547

[51] Int. Cl.⁶ .................................. H04N 5/18
[52] U.S. Cl. ............................... 348/691; 348/696
[58] Field of Search ...................... 348/689, 691, 348/695, 696, 697; 358/170, 171; H04N5/16, 18

[56] References Cited

U.S. PATENT DOCUMENTS 2,936,335  5/1960  Urtel ....................... 348/696

FOREIGN PATENT DOCUMENTS 0235587  9/1987  European Pat. Off. ....... H04N 5/180

Primary Examiner—Victor R. Kostak
Attorney, Agent, or Firm—Oblon, Spivak, McClelland, Maier & Neustadt, P.C.

[57] ABSTRACT

A television (TV) signal alignment method and device are disclosed which provide a clear TV picture. The alignment method provides reduced noise. Despite transmission noise, the alignment method reduces noise at frequencies lower than 15 kHz which is generated by the alignment device, to below the visual perception threshold. This improves signal-to-noise ratio. The alignment method and device reduce this noise while rejecting 50 Hz and 25 Hz frequencies of greater than 30 dB. At each line of an image, the alignment method and device use a feedback loop to successively align a plateau at a first start of the current line of a television signal, which has transmission noise superimposed thereon, on the plateau of the preceding line. This is performed to restore the DC component of the television signal. The low-frequency noise generated in the loop and superimposed on the plateau of the television is reduced by distributing a sampled television signal into two branches of a noise-reduction device at the input of the loop. The sampled television signal is preserved in the first branch, while it is filtered in the second branch. The filtered and preserved signals are subtracted. The level of the plateau of the current line are estimated from the level of the plateau of the preceding line by integrating and storing the level of the plateau corresponding to the current line and adding, successively, the level of the plateau of the preceding line and of the current line. The estimate of the level of the plateau is subtracted from the television signal.

7 Claims, 6 Drawing Sheets

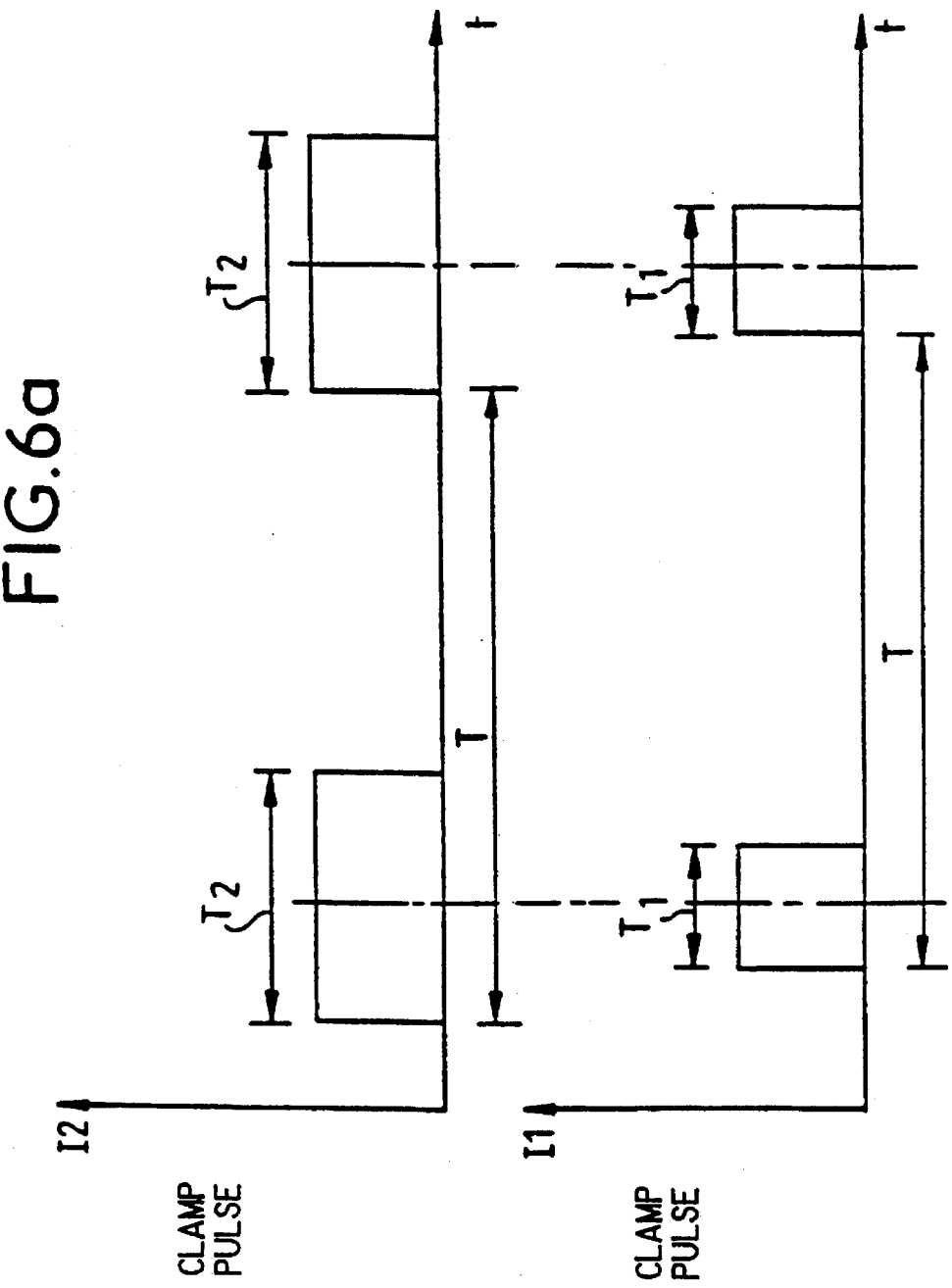

METHOD OF SIGNAL ALIGNMENT IN TELEVISION AND DEVICE FOR IMPLEMENTING IT

The invention relates to transmission of an analogue or digital television signal by radio channel, by satellite or by cabled network, and its subject more particularly is a method of alignment in television with reduced noise and a device for implementing it.

It is known that an alignment device in television, also called clamp, allows the DC component of a television signal to be restored before modulation or after demodulation. This device is used in all the presently known television standards: PAL, SECAM, NTSC, D2 MAC, HD MAC, etc. A television signal undergoes various processings before transmission by a television transmitter and on reception by a television demodulator receiver. During these processings, the DC component of the television signal is spoiled. This is represented, for example on reception, by a slow fluctuation of the level of a composite video signal on which transmission noise is superimposed. In order to get around this fluctuation, it is necessary to stabilize the composite video signal in order to make use of it before a modulation function or after a demodulation function.

A conventional alignment device uses a feedback device, also called feedback loop, the mathematical model and a theoretical diagram of which, taken as example, are described later and correspond respectively to FIGS. 1 and 2.

The summarized theory of an alignment device in television is based on sampling, at the start of each line, a part of the television signal taken over a plateau of constant amplitude containing no video information, chosen as an alignment reference level, and on holding of the average of the level of the signal sampled over the duration of one line, i.e. 64 μs. This signal is next subtracted from the television signal coming into the alignment device so as to restore its DC component. This average is in fact an estimate of the average level of the plateau of the television signal of limited duration on which an error signal is superimposed. This error signal is related to the noise arising from various origins including:

- a modulation noise depending on the type of modulation, on the carrier-to-noise ratio, and on the filters associated with the demodulator,
- a very-low-frequency, periodic or substantially periodic noise, originating from energy dispersion, from a dislocation in frame on the signal, from a low-frequency noise from the transposition oscillators, from the residual 50 Hz, etc.

The alignment device with feedback is generally well suited to the requirements of rejection, of energy dispersion and of very-low-frequency noise in the case of modulation and demodulation. However, during the sampling of a part of the television signal, the device generates noise in the range of frequencies lower than 15 kHz. This frequency range corresponds to the region of the spectrum of very high sensitivity of the eye. The noise generated by the alignment device is manifested visually by the appearance of horizontal streaks on an image when the television signal is very noisy before modulation or demodulation.

A known device developed in the European Patent Application No. 0 281 175 includes, at the front end of the feedback loop, a low-pass filter which filters the high frequencies and the noise which is associated with these frequencies. The filter is activated at start-of-line, after the line synchronization pulse.

Although the device reduces the transmission noise superimposed on the television signal, it does not, however, reduce the noise generated by the loop itself during estimation of the plateau.

By way of example, the 25 Hz and 50 Hz rejection characteristics, as well as the effective signal-to-noise ratio in a band of frequencies from 0 to 10 kHz of a conventional alignment device with feedback are:

50 Hz rejection $\geq$ 30 dB

25 Hz rejection $\geq$ 46 dB

Effective S/N (0–10 kHz) $\leq$ 50 to 60 dB.

The specific 50 Hz and 25 Hz frequencies correspond respectively to the frame synchronization frequency and to the frequency of the triangular energy-dispersion signal in satellite transmission. The effective signal-to-noise ratio of an alignment device is given in the frequency range (0 to 10 kHz) of high sensitivity of the eye.

After experimentation, the threshold of visual perception of the noise of the alignment device is assessed at 65 dB of effective signal-to-noise ratio. The previously given characteristic of the effective signal-to-noise ratio situated between 50 dB and 60 dB is still, in this case, insufficient for the eye not to be sensitive to the noise generated by the alignment device.

This threshold becomes all the more critical in the case of reception of D2 MAC and HD MAC standards, which have enhanced image quality with respect to the PAL, SECAM and NTSC, etc. standards.

In fact, with the definition of the image in the D2 MAC and HD MAC standards being superior to the other standards it has become necessary to obtain an effective signal-to-noise ratio which is closest to the limit of the sensitivity of the eye so that the latter cannot detect an anomaly on a television image, i.e., according to the threshold of visual perception of the eye: effective S/N $\geq$ 65 dB.

Figure 2:
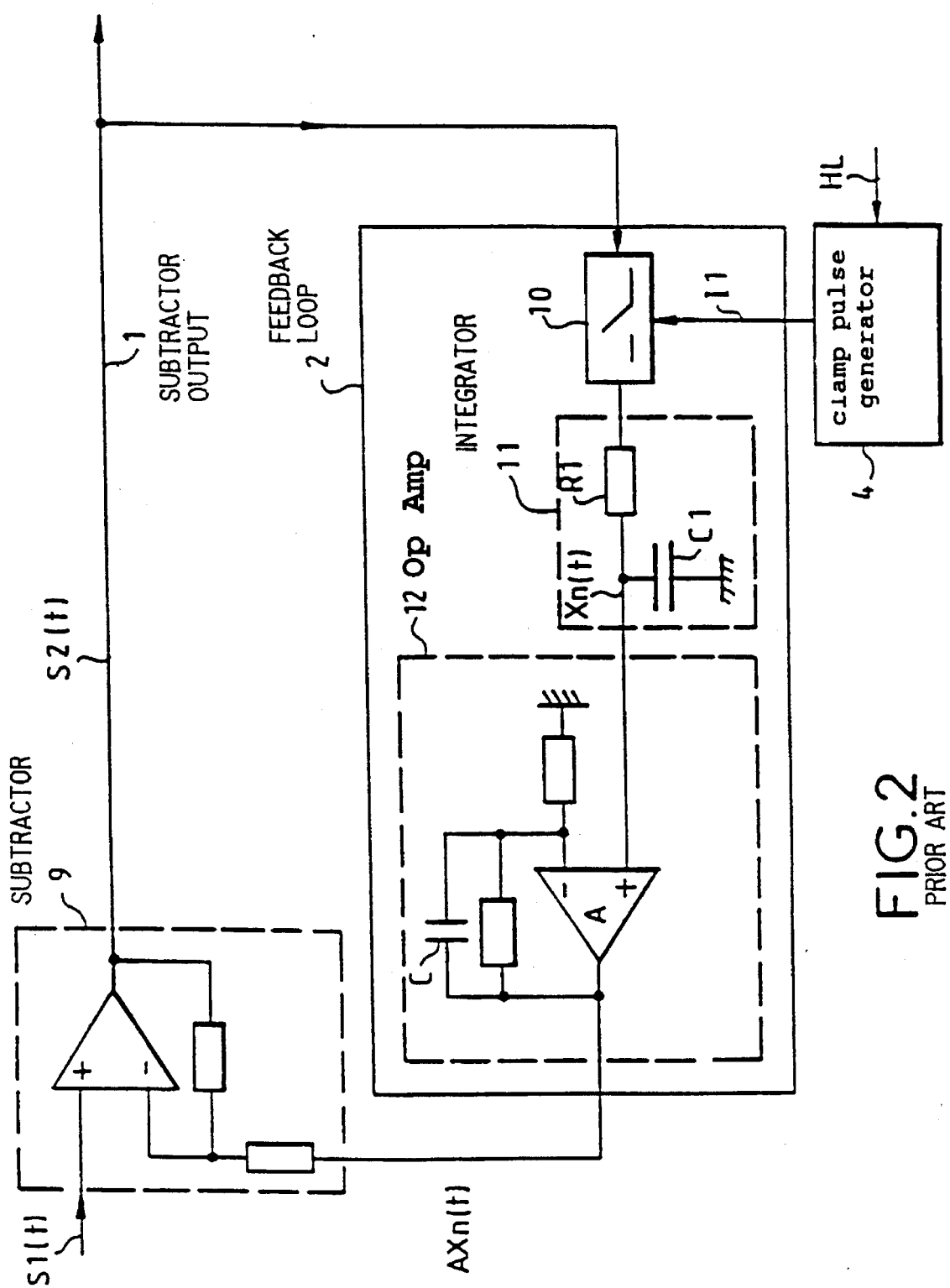

In order to adhere to the 65 dB characteristic, one known solution consists in modifying the time constant R1 C1 of the integrating low-pass filter of a known, feedback-type alignment device described by FIG. 2. However, by improving the effective signal-to-noise ratio, it is the very-low-frequency error signals which are least rejected, which causes a reduction in the 50 Hz and 25 Hz rejection characteristics, represented by a flicker in the television image. The compromise between noise and residual very low frequencies requires an adaptation, and thus a delicate adjustment, case by case, of the time constant of the alignment device.

The object of the invention is to overcome the above mentioned drawbacks.

To this end, the subject of the invention is an alignment method in television using a feedback loop of the type comprising in successively aligning, at each line of an image, a plateau at the first start of the current line of a television signal on which transmission noise is superimposed, on the plateau of the preceding line, for restoring the DC component of the television signal S1(t), characterized in that it comprises, for a predetermined duration T2, in order to reduce the low-frequency noise generated in the loop and superimposed on the plateau of the television signal S1(t), in distributing the sampled television signal into two branches of a noise-reduction device at the input of the loop, in the first branch, in preserving the sampled television signal intact, in the second branch, in filtering the sampled television signal over the duration T2 allowing through only frequencies higher than a defined frequency and the noise associated with these frequencies, in subtracting from the signal restored intact by the first branch (15) the signal output by the second branch (16), over a defined duration T1 lying within the duration T2, in that it comprises, in order to estimate the level of the plateau of the current line from the level of the plateau of the preceding line, in integrating, over the duration T1, the level of the plateau of the current line, in storing the result of the integration of the level of the plateau corresponding to the current line over the whole duration of one line, and in adding, successively, the level of the plateau of the preceding line and of the current line, and in that it comprises in subtracting the estimate of the level of the plateau from the television signal S1(t).

The invention also relates to a device for implementing the method according to the invention.

The alignment method according to the invention has the principal advantage of making it possible, in the presence of all transmission noise, to bring back, to below the visual perception threshold, the noise at frequencies lower than 15 Khz which is generated by the alignment device, likely to degrade the quality of the television images, while guaranteeing rejection of the 50 Hz and 25 Hz frequencies of greater than 30 dB.

Figure 3:
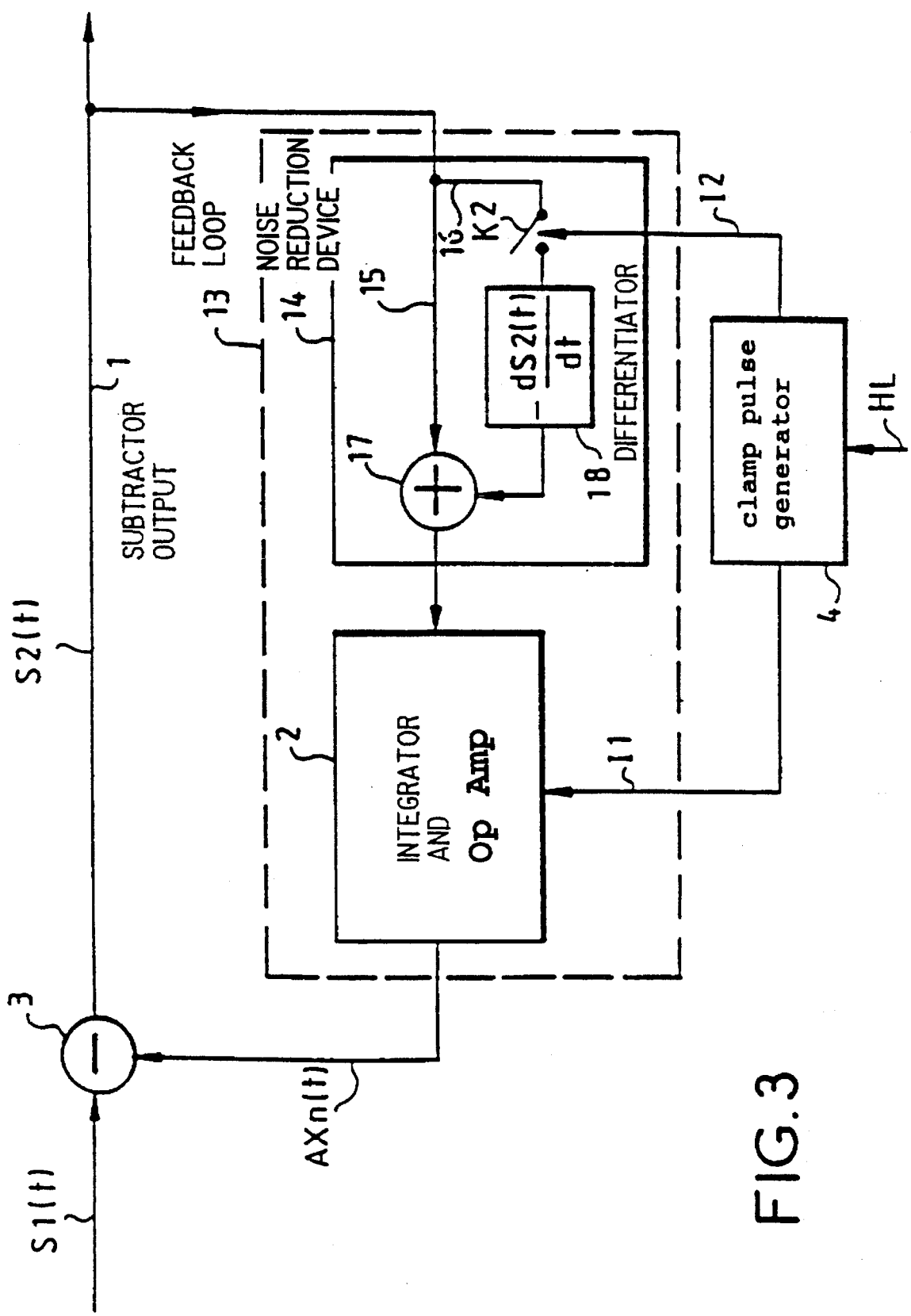
Figure 4:
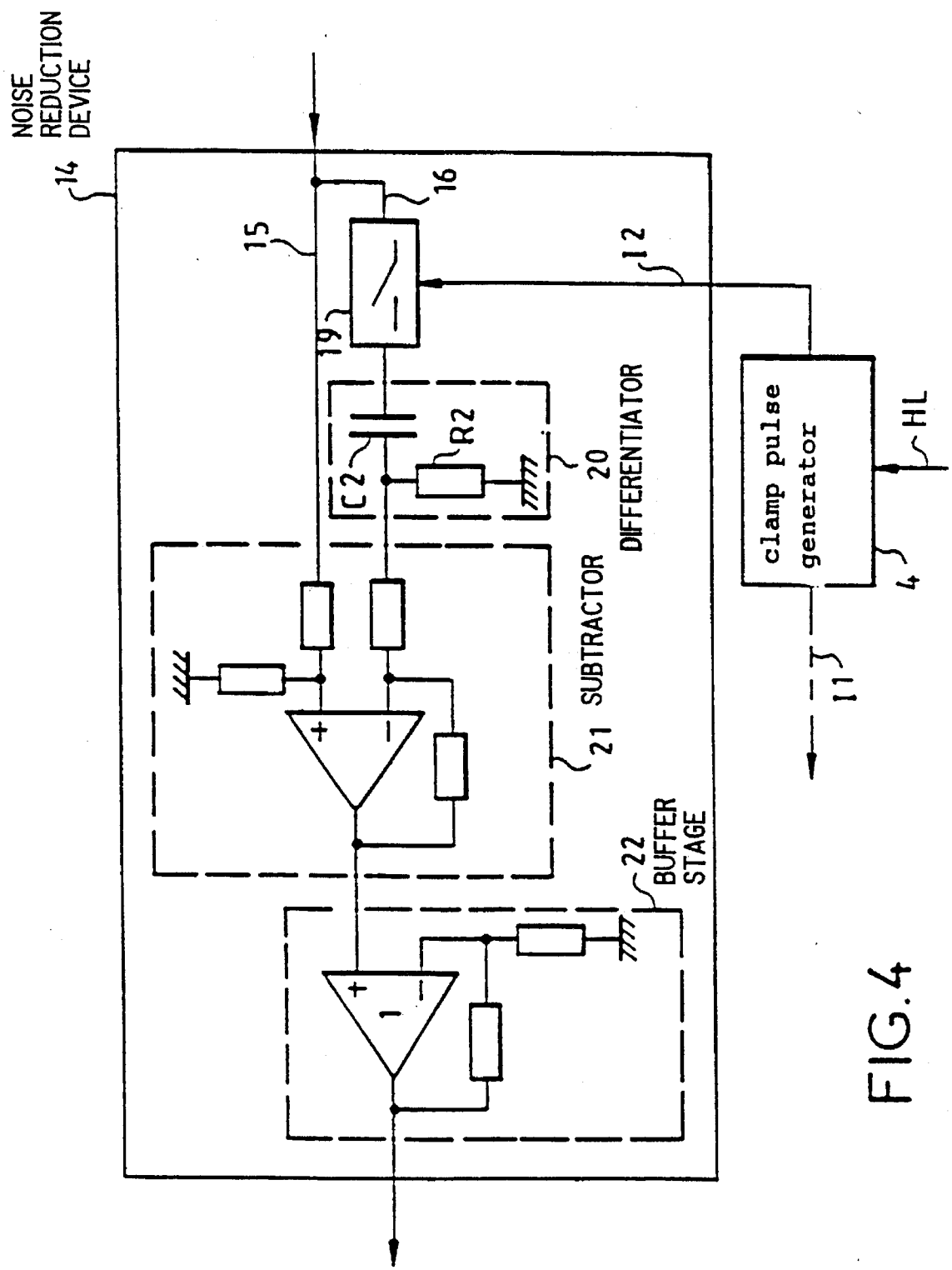
Figure 5:
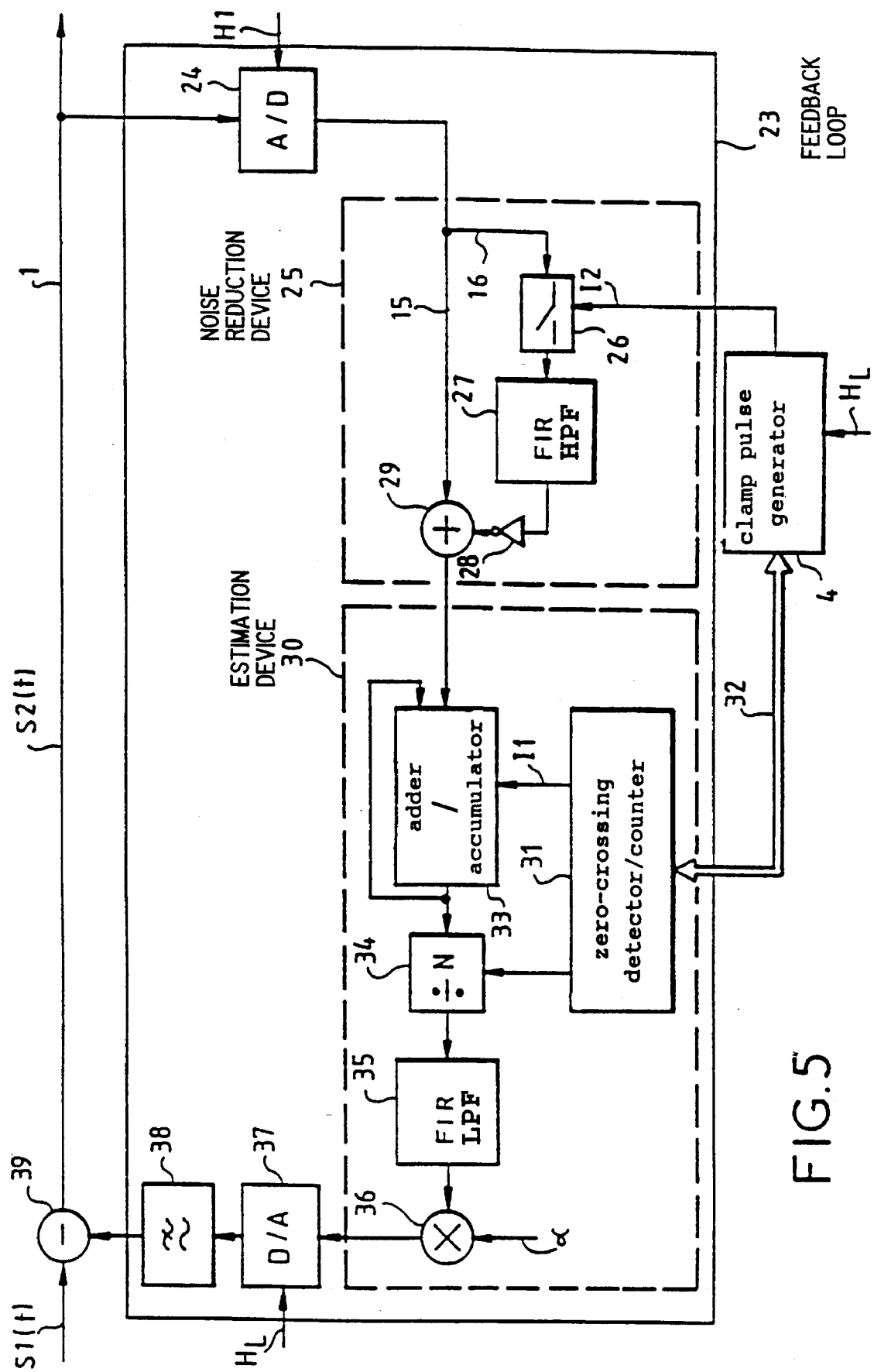

Other features and advantages of the invention will emerge clearly in the following description given by way of non-limiting example and given with regard to the attached figures which represent:

FIGS. 1 and 2, the abovementioned figures relating to the mathematical model and to one example of an embodiment of an alignment device according to the prior art, FIG. 3, the mathematical model of the alignment device for implementing the method according to the invention, FIG. 4, an embodiment of an alignment device for implementing the method according to the invention, FIG. 5, a second embodiment of an alignment device for implementing the method according to the invention, and FIGS. 6a and 6b, the timing diagrams corresponding respectively to the clamp pulses I1 and I2.

In the figures described below, the same elements will be referenced by the same marks.

The known principle of a feedback-type alignment device is illustrated by the mathematical model of FIG. 1.

The model of an alignment device includes a main circuit 1, a feedback device 2, or feedback loop, represented within a solid line, which reinjects a part of the output signal from the main circuit 1 into the input of the circuit 1.

A television signal S1(t) is injected into the main circuit 1 on a first operand input of a subtraction operator 3. The signal S1(t) consists of a composite video signal on which is superimposed noise arising from previous processings. During these processings, the DC component of the signal S1(t) has been spoiled. The signal S1(t) fluctuates slowly, synchronized to the 25 Hz or to the 50 Hz. The signal AXn(t), defined later, coming from the output of the feedback loop 2, is injected onto the second operand input of the subtraction operator 3.

The output of the subtraction operator 3 is an aligned signal or clamped signal S2(t).

The signal S2(t) then consists of the composite video signal of the signal S1(t), of which the alternating 25 Hz or 50 Hz component has been suppressed, and, after a few lines, the DC component of the television signal S1(t) is restored intact.

The feedback loop 2 samples a part of the signal S2(t) from the main circuit 1. It is activated during the closure of a switching element K1 controlled by a clamp pulse generator 4 delivering a clamp pulse I1 synchronized to a clock signal $H_L$ output by a line synchronization clock, not represented. The clamp pulse I1 of duration T1, output by the clamp generator 4, is synchronized to a plateau taken as reference level, that is to say, a level of the composite video signal of constant amplitude as a function of time, situated at start-of-line.

The plateau may be chosen, for example, as the suppression level, the black level, etc. For the D2 MAC and HD MAC standards, the plateau may be chosen on a grey level, for example the intermediate grey level between the black level and the white level (50% black, 50% white). It may also be chosen as the level of passing from the logic zero state of the duo-binary signal corresponding to the digital coding of the sound at start-of-line, or of a purely digital television signal.

During the time T1, corresponding to the duration of sampling of the signal S2(t), the sampled signal is applied to the input of an integration operator 5, the main function of which is to calculate the average value of the sampled signal over the duration T1. The average value resulting from the integration is held (or stored in memory) for the duration of one line.

A hold circuit 6 is symbolized by the delay T=64 μs corresponding to the duration of one line.

The value of the average level of the plateau corresponding to the current line is applied to a first operand input of an addition operator 7, and the value Xn−1(t) corresponding to the value of the preceding line is applied to the second operand input of the addition operator 7.

The signal Xn(t) obtained from the signal Xn−1(t), at the output of the addition operator 7, corresponds to a DC signal on which is superimposed a noise generated during the sampling of duration T1. The signal Xn(t) is next applied to a first operand input of a multiplication operator 8, and a quantity A, corresponding to the amplification value of the feedback loop 2 is applied to the second operand input of the multiplication operator 8. The output signal AXn(t) is next applied to the second operand input of the subtraction operator 3 at the input of the main circuit 1.

An embodiment corresponding to the mathematical model of FIG. 1 is given, by way of example, by the diagram of FIG. 2.

The description of this diagram makes it possible to detail the operating principle of a feedback-type alignment device, relying, for this description, on the specific functions of the operators produced with the aid of conventional analogue electronic circuits.

The subtraction operator 3 is produced from an operational amplifier mounted as a subtractor circuit 9, represented within a closed dashed line. The signal AXn(t), applied to the inverting input of the operational amplifier, is subtracted from the signal S1(t) applied to the non-inverting input of the same amplifier.

A part of the signal S2(t) is sampled in the feedback loop 2 during the time imposed by the duration T1 of the clamp pulse I1. This function is carried out by a switching circuit 10, produced, for example, from a transistor in switching mode, with, as periodicity, the duration of one line, i.e. for example T=64 μs. The integration operator 5 is a first-order integrator 11 of the R,C type consisting of a resistor R1 and of a capacitor C1. The integrator 11 is a low-pass filter letting through only the frequencies lower than a cut-off frequency defined at 3 dB by ½πR1C1, as well as the noise associated with these frequencies. The integrator 11 performs an "estimate" of the average value of the plateau of the sampled signal on which the sampled signal S1(t) is superimposed, as well as the noise generated by the alignment device. Over the duration T1, the capacitor C1 charges up to a value Xn(t).

Due to the high input impedance of an operational amplifier 12 described later and to the time constant given by the product R1C1, the potential at the terminal of the capacitor C1 is maintained throughout the duration of one line equal to T until the next closure of K1. The capacitor C1 is the hold circuit 6 for the information Xn(t).

When a new Xn(t) value, corresponding to a new line, is applied to the capacitor C1, the latter, charged to the preceding value Xn−1(t), charges or discharges according to whether Xn(t) is higher than or lower than Xn−1(t):

for an Xn(t) higher than Xn−1(t), the capacitor charges up, and Xn(t)=Xn−1(t)+ΔV for Xn(t) lower than Xn−1(t), the capacitor discharges and Xn(t)=Xn−1(t)−ΔV.

ΔV corresponds to a small voltage variation, the amplitude of which is directly related to the amplitude of the noise, superimposed on the plateau.

The variation of the signal S1(t) is thus followed and practically reproduced by the loop 2.

In order to bring the level of the signal Xn(t) to a level compatible with the signal S1(t), the signal Xn(t) is amplified by an operational amplifier mounted as a non-inverting amplifier 12 with high gain A of predetermined value, represented within a closed dashed line, corresponding to the multiplication operator 8. A capacitor C mounted between the inverting input and the output of the amplifier 12 allows the high-gain amplifier to be stabilized.

The signal AXn(t) output by the feedback loop 2, is subtracted from the input signal S1(t). Following a limiting number of lines, the alternating component of the signal S1(t) is suppressed and the DC component is thus restored in the signal S2(t).

FIG. 3 shows the mathematical model of the reduced-noise, feedback-type alignment device for implementing the method according to the invention.

The alignment device for implementing the method according to the invention includes a feedback device 13, represented within a closed dashed line, including a first known device 2, identical to the one previously described, as well as a second device 14, represented within a solid closed line, coupled at the front end of the first one in order to reduce the noise generated by the first device 2.

The device 14 reduces the noise associated with the frequencies lower than 15 kHz, which is superimposed on the plateau on which the average level of the DC component of the signal S2(t) is estimated, over a duration T2, without degrading the useful information carried by the signal S2(t). As the processing performed by the first device 2 is identical to that previously described, it will therefore not be described again.

The noise reduction device 14 consists of a circuit including two branches 15 and 16:

a first branch 15 samples a part of the signal S2(t) which is applied directly to a first operand input of an addition operator 17.

the same signal is sampled by the second branch 16 of the device 14 which is activated over a duration T2 of closure of a switching element K2 controlled by the clamp pulse generator 4 which delivers the pulse I1 and a second clamp pulse I2 fixing the duration T2. So that the device 13 can operate effectively, the duration T2 of the pulse I2 is chosen in such a way as to contain the duration T1 of the pulse I1.

The signal sampled in the second branch 16 is applied to the input of a negative differentiation operator 18, the differentiation function of which makes it possible to keep the profile of the noise superimposed on the signal S2(t) and the high-pass filtering function of which makes it possible to extract the noise of the frequencies higher than the cutoff frequency of the filter from the wide band noise superimposed on the signal S2(t). The derivative of the sampled S2(t) signal is next applied to the second operand of the addition operator 17.

The output signal from the operator 17 corresponds to a composite video signal in which the noise associated with the frequencies lower than 15 kHz, superimposed on the plateau taken as reference level for estimation of the DC component, has been considerably reduced due to the subtraction of the wide band noise of a part of the signal S2(t) sampled in the first branch 15 from the noise of the frequencies higher than the cutoff frequency of the filter, extracted in the second branch 16.

One embodiment of the noise reduction device 14 corresponding to the mathematical model of FIG. 3 is given by way of example by FIG. 4.

A part of the S2(t) signal is sampled in the two branches 15 and 16 of the device 14. In the second branch 16, the signal S2(t) is sampled by a second switching circuit 19 which, as for the first known device 2 previously described, can be produced, for example, from a transistor in switching mode. The negative differentiation operator 18 is a first-order differentiator 20, of C,R type, represented within a closed dashed line, consisting of a capacitor C2 and of a resistor R2. The differentiator is a high-pass filter letting through only the frequencies higher than the cut-off frequency at 3 dB imposed by ½πR2C2, i.e., for example, 500 Hz upper cutoff frequency. As in any high-pass filter, the 0 Hz frequency, thus DC, is suppressed.

The signal delivered at the output of the differentiator 20 still contains the noise superimposed on the plateau taken as reference level for estimating the DC component, but without DC component and without the noise, superimposed on the composite video signal, of the frequencies lower than the cutoff frequency of the filter.

The signal is next applied to the inverting input of an operational amplifier mounted as a subtractor 21, represented within a closed dashed line, and the part of the signal S2(t), sampled in the first branch 15, of the device 14, is applied intact to the non-inverting input of the same amplifier 21.

The addition operator 17 of the mathematical model of FIG. 3 is formed by the subtractor 21, the inverting input of which receives the signal resulting from the differentiation which amounts in fact to performing an "addition" of a negative signal. The subtractor 21 thus makes it possible to keep the sign of the signal S2(t) on its output.

The output signal delivered by the subtractor 21 is next applied to the input of a buffer stage 22 with an operational amplifier mounted as a unit-gain, non-inverting amplifier, represented within a closed dashed line, serving as an impedance matching stage between the output of the device 14 and the input of the first device 2.

Thus the processing performed by the device 14 does not impair the sampled S2(t) signal, neither in terms of its content, nor in terms of its sign. The processing bears solely on the noise superimposed on the composite video signal from which arises the error made in the estimate of the plateau taken as reference level for restoring the DC component of the signal.

As the processing by the first device 2 remains identical to that of the prior art, it will therefore not be described again.

The effectiveness of each device constituting the feedback loop 13 is determined by the pairs (R1, C1) and (R2, C2)

which define the rejection and signal-to-noise ratio characteristics respectively for each device.

Likewise, the overall effectiveness of the two devices, 2 and 14, is related to an optimization of the interaction of the pairs (R1, C1) and (R2, C2).

The functional diagram of a second embodiment of an alignment device according to the invention is described in FIG. 5.

This second embodiment uses digital circuits for implementing the majority of the functions described in the mathematical model of the alignment device according to the invention illustrated by FIG. 3.

The alignment device according to the invention produced from digital components is principally intended for processing a television signal in the D2-MAC standard.

A D2-MAC signal is a composite video signal consisting of digital information (sound) and analogue information (chrominance, luminance). The sound is digitized in the form of a duo-binary signal, that is to say of a digital signal taking the logic states "1", "0", "−1". For such a television signal, the reference level (or plateau) is chosen at start-of-line as the level corresponding to the duo-binary signal passing to the "0" logic state.

The digital device according to the invention includes finite-impulse-response (F.I.R.) filters for carrying out low-pass and high-pass filtering.

The low-pass or high-pass type of the filter is determined by the coefficients $a_i$ of the equation of the filter given by the following formula:

$$Y(n) = \sum_{i=1}^{\infty} a_i X(n-i)$$

The two main features of these filters are their stability and their phase linearity. In contrast, the quantization noise introduced by these digital components has to be taken into account. The effective signal-to-noise ratio sought is of the order of 67 dB for the alignment device, and the quantization noise of the device corresponds to the sum of the quantization noise powers for each filter. In order for the noise not to have an impact on the overall signal-to-noise ratio of the alignment device, the overall quantization signal-to-noise ratio has to be about 80 dB, i.e. some 10 dB higher than the effective signal-to-noise ratio sought. Quantization is related to the number of bits necessary for digitizing the television signal.

For example, digitizing over 14 bits corresponds to a quantization signal-to-noise ratio of 80 dB.

FIG. 5 describe the digital alignment device according to the invention.

The signal sampled from the main circuit 1 by a feedback loop 23, represented within a solid closed line, is converted into a digital signal by an analogue-digital (A/D) converter 24 at the rate of a clock frequency H1, for example 10,125 MHz for a D2-MAC signal, determined by the passband of the standard.

As for the first embodiment, a first noise-reduction device 25 represented within a closed dashed line is placed at the front end of the feedback loop 23.

The digital signal is applied to the two input branches of the noise-reduction device 25. As this device 25 is identical, from the point of view of its modelling and of its function, to the previous embodiment, it will therefore be described only qualitatively.

The switching element K2 is this time represented by a sampler 26 controlled by the pulse I2 delivered by the clamp pulse generator 4. The output of the sampler 26 is coupled to a first finite-impulse response filter 27 performing the function of high-pass filtering. The output of the filter 27 is coupled to an invertor circuit 28, the output of which is coupled to a first operand input of a digital adder 29 directly receiving the output signal from the (A/D) converter 24 on its second operand input.

The output of the adder 29 is coupled to the input of a device 30 for estimating an error signal ε of a known digital alignment device, represented within a closed dashed line, and detailed in an article by J. VEILLARD which appeared in Electronics Letters of 26 Sep. 1991 Vol. 27 No. 20, pages 1790–1791.

The principle of the device 30 for estimating the error signal ε consists firstly in sampling the television signal on each zero-crossing of the duo-binary signal corresponding to the digitally coded sound signal. Each zero-crossing, corresponding to the transmission of an information item including a logic zero level, supplies an error voltage Vi.

Estimation of the error signal ε is next obtained by dividing the sum of the error voltages Vi by a number N of zero-crossings. The clamp pulse generator 4, via a bus 32, passes a part of the signal S1(t), prior to the generation of windows corresponding to impulses I1 and I2, to a zero-crossing detector/counter 31. The duration T1 of the clamp pulse I1, delivered by the clamp pulse generator 4, corresponds to the duration of a logic zero level and allows detection of the zero-crossings making it possible to activate an adder/accumulator 33 quoted below.

The device 30 for estimating the error signal ε includes, in order, the adder/accumulator 33, the output of which is looped back to the input, making it possible to load and to add the error voltages Vi successively on each detection of a reference level, originating from the zero-crossing detector/counter 31. The output of the adder/accumulator 33 is next coupled to a divider-by-N, 34. N corresponds to the number of zeros detected output by the zero-crossing detector/counter 31. At the output of the divider 34, the average of the voltages Vi, i.e. the error signal ε, is given by the equation:

$$\epsilon = \frac{1}{N} \sum_{i=1}^{N} Vi$$

The output of the divider 34 is coupled to a second finite-impulse-response filter 35 of low-pass type, and the delay contributed by the filter 35 is chosen to be equal to the duration of one line.

The output of the filter 35 is coupled to a first operand input of a multiplier 36 receiving, on the second operand input, a constant α, lying between 0 and 1, the inverse of which, 1/α, corresponds to the number of lines necessary for an alignment device to be effective (for example 4 to 5 lines). The output of the multiplier 36 and thus the output of the device 30 for estimating the error voltage ε is coupled to the input of a D/A converter, 37, synchronized to the line synchronization clock frequency $H_L$, for example, $fH_L$= 15625 Hz.

The output of the converter 37 is coupled to a clock frequency rejector low-pass filter 38, the output of which is coupled to the second operand input of an analogue subtractor circuit 39 which may be identical, for example, to the subtractor 9 of the first embodiment. The output signal of the loop 23 is subtracted from the input signal S1(t) applied to the first operand of the subtractor 39 and the signal S2(t) is obtained at the output of the subtractor 39.

In the case of a purely digital signal S1(t), the input subtractor 39 of the alignment device according to the invention is a digital subtractor and the A/D, 24, and D/A, 37, convertors, as well as the rejector filter 38, are dispensed with.

FIGS. 6a and 6b give an example of a timing diagram for the clamp pulses I1 and I2. The pulses I1 and I2, of duration T1 and T2 respectively and of period T are synchronous and chosen, in this example, such that T2≧2T1 with T1 centred on T2.

In the specific case of a D2 MAC or HD MAC television signal the duration T1 is 500 ns, from which that of T2=1 μs.

Thus, for each line, without increasing the noise of the low frequencies (≦15 kHz) the invention carries out subtraction of a plateau from which the noise of the frequencies higher than the cutoff frequency of the high-pass filter, 500 Hz in the preceding example, from the noisy signal S2(t), and allows the DC component of a television signal St(t) to be restored before the modulation function or after the demodulation function of the transmission channels for a television signal.

The characteristics obtained with an alignment device according to the invention are as follows:

50 Hz rejection=31 dB

25 Hz rejection=47 dB clamp eff S/N (0–10 kHz)≧67 dB

The invention is not limited to the two specific embodiments previously described, in particular the low pass-pass and high-pass filters may be of any order.

We claim:

1. An alignment method in television using a feedback loop used to successively align, at each line of an image, a plateau at the start of a current line of a television signal on which transmission noise is superimposed, with a plateau of a preceding line, for restoring a DC component of the television signal, comprising the steps of:

distributing a sampled television signal into two branches of a noise-reduction device at an input of the feedback loop, said distributing step being performed during a first predetermined duration, in order to reduce low-frequency noise generated in the feedback loop and superimposed on a plateau of the television signal, in a first branch, preserving the sampled television signal intact, in a second branch, filtering the sampled television signal over the first predetermined duration so as to allow through only frequencies higher than a defined frequency and noise associated with these frequencies, during a second predetermined duration, subtracting from the preserved signal restored on the first branch the filtered signal on the second branch, said second predetermined duration lying within the first predetermined duration, estimating a level of the plateau of the current line from a level of the plateau of the preceding line, and subtracting an estimate of the level of the plateau from the television signal S1(t), wherein said estimating step comprises the steps of:

during the second predetermined duration, integrating a level of the plateau of the current line, storing a result of the integration of the level of the plateau corresponding to the current line over a whole duration of one line, and successively adding the level of the plateau of the preceding line and of the current line.

2. An alignment device for aligning a television signal comprising:

a subtractor having a first operand input, a second operand input, and an output, said subtractor outputting an aligned signal, wherein said subtractor output is connected to a feedback loop, a noise reduction device for reduction of a noise generated by the alignment device, said noise reduction device being at a front end of the feedback loop and including:
      an operator having a first operand input and a second operand input,
      a first branch which is connected directly to the first operand input of the operator, and
      a second branch, wherein said second branch includes, a first means for authorizing transmission of a part of the plateau of a current line, and a means for filtering of the plateau, said first authorizing means having an output connected to the filtering means, and said filtering means having an output which is connected to the second operand input of the operator, an estimating device for estimating a level of the plateau of the television signal, said estimating device having an input and an output, wherein said estimating device input is connected to the operator output of the noise reducing device, and includes:
      a second means for authorizing transmission of the level of the plateau of the current line,
      a means for integrating, and
      a means for filtering and holding, said second authorizing means being connected to said integrating means, said integrating means and said filtering and holding means operating on the level of the plateau of the current line, an amplification means, wherein an output of said filtering and holding means is connected to said amplification means, and an output of the estimation device corresponding to an output of the amplification means, said amplification means output being connected to the first operand input of the subtractor which receives the television signal on the second operand input, wherein said subtractor outputs the aligned signal.

3. The alignment device of claim 2, wherein the operator of the noise-reduction device includes an analog operational amplifier acting as a second subtractor, said operational amplifier having an inverting input which receives a signal outputted by the second branch of the noise reduction devise, wherein the first transmission authorization means includes an analog switching circuit controlled by a pulse having a first duration, said pulse being delivered by a clamp pulse generator, and wherein the filtering means includes a high-pass filter and an R,C-type differentiator of any order.

4. The alignment device of claim 2, wherein the second transmission authorizing means of the estimation device includes an analog switching circuit controlled by a pulse having a duration T1, said pulse being delivered by a clamp pulse generator, wherein the integration means and the filtering and holding means of the estimation device includes a high-pass filter and a C,R-type integrator of any order, wherein the filtering and holding means includes a capacitor, and the amplification means includes an analog operational amplifier connected as a non-inverting amplifier having a loop gain A.

5. The alignment device of claim 2, wherein the operator of the noise-reduction device includes a digital adder, wherein the first transmission authorization means includes a sampler circuit controlled by a pulse having a duration, said pulse being delivered by a clamp pulse generator, and wherein the filtering means includes a finite-impulse-response digital filter of any order, said digital filter having coefficients which are defined to give a high-pass structure to the digital filter, said digital filter having an output which is connected to a digital inverter circuit.

6. The alignment device of claim 2, wherein in the estimation device:

the second transmission authorizing means includes a digital zero-crossing detector and a counter circuit controlled by a bus, the integration means includes a digital adder and accumulator circuit, said digital adder and accumulator circuit being connected to a digital divide-by-N circuit, wherein N corresponds to a number of zero-crossings detected by the zero-crossing and counter circuit, wherein the filtering and holding means includes a finite-impulse-response digital filter of any order, said digital filter having coefficients which are defined to give a low-pass structure to the digital filter, and whose transfer time is equal to a duration of one line, and wherein the amplification means includes a digital circuit which is a multiplier by a defined constant $\alpha$.

7. The alignment device of claim 2, wherein the subtractor circuit includes an analog operational amplifier acting as the subtractor, said operational amplifier having a non-inverting input, an inverting input, and an output, said operational amplifier receiving the television signal on the non-inverting input and an output of the feedback loop on the inverting input, and delivering on said operational amplifier output, the aligned television signal, said alignment device further comprising an analog-to-digital converter, a digital-to-analog converter, and a filter, said digital-to-analog converter having an input and an output, and said filter having an input and an output, wherein the analog-to-digital converter is connected to an input of the noise-reduction device, and wherein the input of the digital-to-analog converter is connected to the output of the estimation device, the output of the digital-to-analog converter being connected to the input of the filter, said filter rejecting a clock frequency which synchronizes the digital-to-analog converter, the output of the filter being connected to the inverting input of the subtractor.

\* \* \* \* \*